US006186585B1

United States Patent
Okada et al.

(12) United States Patent
(10) Patent No.: US 6,186,585 B1
(45) Date of Patent: Feb. 13, 2001

(54) VEHICLE SUNSHADE DEVICE

(75) Inventors: Hiroshi Okada; Nobuo Ito, both of Kanagawa; Yoshihiro Yamashita, Tokyo, all of (JP)

(73) Assignees: Ohi Seisakusho Co., Ltd., Yokohama; Fuji Jukogyo Kabushiki Kaisha, Tokyo, both of (JP)

( * ) Notice: Under 35 U.S.C. 154(b), the term of this patent shall be extended for 0 days.

(21) Appl. No.: 09/333,029

(22) Filed: Jun. 15, 1999

(30) Foreign Application Priority Data

Jun. 15, 1998 (JP) ................................... 10-167378
Jun. 15, 1998 (JP) ................................... 10-167379

(51) Int. Cl.[7] .................................................. B60R 13/02
(52) U.S. Cl. ........................................... 296/214; 296/223
(58) Field of Search ..................................... 296/214, 223; 160/226–228

(56) References Cited

U.S. PATENT DOCUMENTS 5,951,100 * 9/1999 Ewing et al. ......................... 296/214

FOREIGN PATENT DOCUMENTS

3920372 * 8/1990 (DE) ..................................... 296/223
4041908 * 1/1992 (DE) ..................................... 296/214

* cited by examiner

*Primary Examiner*—Dennis H. Pedder
(74) *Attorney, Agent, or Firm*—Foley & Lardner (57) ABSTRACT

A vehicle sunshade device has guide rails disposed on both sides of an opening formed in a roof of a vehicle. The guide rails each has a guide groove having in turn a straight portion oriented longitudinally and extending substantially horizontally and an inclined portion continuous with the straight portion. Sliding members are slidably fitted in the groove, the sliding members being provided on sides of a sunshade for opening and closing the opening, being made larger in longitudinal length than in thickness and being elastically deformable in vertical directions. A vertical gap in the inclined portion at least at an intermediate portion thereof is made larger than a vertical gap in the straight portion of the guide groove. In the case of the vehicle sunshade device having front and rear sunshades, sliding members each having a portion for abutment at a front upper portion are provided on both sides of a rear sunshade at a front portion thereof. And side plates are provided on both sides of a front sunshade which each have at a rear end thereof an abutment portion adapted to be brought into abutment with the portion for abutment of the sliding member so as to push the rear shade rearward. An inclined portion is provided below the abutment portion in such a manner as to incline forwardly downwardly so as to push the portion for abutment of the sliding member downwardly toward the rear when the sunshade approaches the fully opened position, and a lower edge extending continuously from a front end thereof toward the front so as to prevent the upward movement of the sliding member.

8 Claims, 9 Drawing Sheets

VEHICLE SUNSHADE DEVICE

BACKGROUND OF THE INVENTION

1. Field of the Invention

The present invention relates to a vehicle sunshade device constructed such that an opening formed in a roof of a vehicle is opened and/or closed by a sunshade for shielding a passenger compartment of the vehicle from sunlight, and more particularly to a construction for guide rails for guiding the sunshade.

The present application is based on Japanese Patent Application No. Hei. 10-167378 and No. Hei. 10-167379, which are incorporated herein by reference.

2. Description of the Related Art

A conventional sunshade device such as fitted on a roof of, for example, a van comprises a sunshade disposed under a light-transmissive sunroof lid for opening and/or closing a opening formed in a roof of the van for shielding a passenger compartment of the van from sunlight, and guide rails for longitudinally slidably supporting the sunshade.

The sunshade can move between a fully closed position where it closes the opening under the sunroof lid and a fully opened position where it is stored in a storing portion formed between the ceiling of the passenger compartment and the roof of the van. The guide rails each have a guide groove for guiding the sunshade along a desired locus and in which sliding members are slidably fitted which can elastically be deformed in vertical directions and are provided on both sides of the sunshade at front and rear ends thereof. The guide grooves each have a front straight portion, a rear straight portion positioned vertically higher than the front straight portion and a inclined portion disposed between the front and rear straight portions and inclined moderately upwardly toward the rear. The sunshade is stored in the storing portion while being displaced upwardly when the sliding members are moved from the front straight portions to the rear straight portions via the inclined portions (refer, for instance, Japanese Utility Model Publication No. Hei. 3-70515).

With the conventional sunshade described above, for instance, when the sunshade is moved from the fully closed position to the fully opened position, with the rear sliding members entering the inclined portions, the sunshade is displaced upwardly at a rear end thereof, when the front sliding members are guided by the front straight portions so as to move horizontally therealong. This causes a difference in locus along which the front and rear sliding members move, and the deflection amount of the rear sliding members is changed at the inclined portions, the sliding operation force for the sunshade thereby becoming unstable. Thus, there is caused a problem that no smooth sliding operation of the sunshade can be obtained.

Further, a certain type of sunroof device is provided with two front and rear sunshades for shielding a passenger compartment of the vehicle from sunlight.

In a sunshade device of this type, when the opening is closed, the front and rear sunshades are disposed substantially on the same horizontal plane with a rear end of the front sunshade and a front end of the rear sunshade abutting with each other, and when the front sunshade is slid rearward from the above state, the rear sunshade is pushed rearward, and after the rear sunshade is stored in a storing portion formed in a lower portion of the roof, the abutment relationship between the front and rear sunshades is released. Thereafter only the front sunshade is moved alone further rearward, and in a fully opened state, the front sunshade and rear sunshade are stored in the storing portion with the former being stacked above the latter in a one-on-the-other fashion (refer, for instance, Japanese Utility Model Publication No. Hei.5-60919).

With a conventional sunshade device as described above, however, in the fully opened state, the front and rear sunshades are disposed vertically with a certain gap being maintained therebetween, and this may cause a risk of producing a looseness of the two sunshades so disposed.

In order to eliminate such a risk, there is proposed a design in which a leaf spring is provided in a storing portion for two sunshades so as to bias a rear sunshade upwardly (refer, for example, to Japanese Patent Publication No. Hei.5-24437). However, in this sunshade device, both of front and rear sunshades are biased upwardly by the leaf spring, it should be necessary to prepare a large and strong leaf spring, and there is a risk that front and rear sunshades are rubbed with each other, so skin materials thereof are damaged.

SUMMARY OF THE INVENTION

In view of the above problems, a first object of the present invention is to provide a vehicle sunshade device that can always provide a stable sliding operation force for a sunshade to thereby enable smooth opening and closing operations of the sunshade.

In addition, a second object of the present invention is to provide a vehicle sunshade device that can securely prevent the occurrence of a floating of a rear sunshade at the time of opening, as well as a looseness of front and rear sunshades, which can also prevent the rubbing of skin materials of the sunshades, and which can allow the both sunshades to be opened and/or closed in a smooth fashion.

According to a first aspect of the present invention, there is provided a vehicle sunshade device is comprising: a sunshade for opening and closing an opening formed in a roof of a vehicle; a sliding member being provided on a side of the sunshade, a longitudinal length of the sliding member being larger than a vertical length thereof and being elastically deformable in a vertical direction; and a guide rail disposed on a side of the opening, the guide rail having a guide groove including a straight portion oriented longitudinally and extending substantial horizontally and an inclined portion continuous with the straight portion, the sliding member being slidably fitted in the guide groove. In this vehicle sunshade device, a vertical gap in the inclined portion at least at an intermediate portion thereof is made larger than a vertical gap in the straight portion.

It is preferable that one of an upper surface and a lower surface of the sliding member is formed into a convexly curved surface.

Further, it is also preferable, one of an upper surface and a lower surface of the sliding member is formed into a convexly curved surface in which an apex portion is located at a center of the sliding member, and the other of the upper surface and the lower surface is formed into a wavy configuration having two convexly curved surfaces in which apex portions are located at positions closer to front and rear ends of the sliding member, respectively.

According to a second aspect of the present invention, there is provided a vehicle sunshade device comprising: a front sunshade and a rear sunshade arranged one after the other in a longitudinal direction for opening and closing an opening formed in a roof of a vehicle; guiding means provided on a side of the opening for guiding the front and rear sunshades between a fully closed position where the front and rear sunshades are arranged to align with each other in a longitudinal direction to thereby close the opening and a fully opened position where the front and rear sunshades are positioned below and rearward of the opening with the front sunshade being stacked above the rear sunshade; and pushing means for pushing a front end of the rear sunshade until the rear sunshade reaches the fully opened position when the front sunshade is moved rearward. The pushing means comprises: a sliding member disposed one of the rear sunshade and the front sunshade; and a side plate disposed on the other of the rear sunshade and the front sunshade. The side plate comprises: an abutment portion provided at a rear end of the side plate, the abutment portion being to be brought into abutment with the sliding member so as to push the rear sunshade rearward; an inclined portion provided below the abutment portion inclining forwardly and downwardly to push the sliding member downwardly and rearward when the rear sunshade reaches or approaches the fully opened position; and a lower edge extending continuously and forward from a front end of the inclined portion, the lower edge reaching at least a position directly above the sliding member so as to prevent an upper movement of the sliding member when the front and rear sunshades are located in the fully opened position.

It is preferable that elastic tongue piece is disposed on the sliding member to press the sliding member on the lower edge. A check portion can be provided on the lower edge of the side plate to impart a resisting force against a movement of the front sunshade in the longitudinal direction when the elastic tongue piece is brought into engagement therewith.

It is also preferable that a damper member is disposed on one of a contacting surface between the sliding member and the side plate. The damper member can be formed of flocking piles planted on one of the contacting surface between the sliding member and the side plate.

Features and advantages of the invention will be evident from the following detailed description of the preferred embodiments described in conjunction with the attached drawings.

DETAILED DESCRIPTION OF THE PREFERRED EMBODIMENTS

The accompanying drawings FIGS. 1 to 9 show a first embodiment of the present invention.

Figure 3:
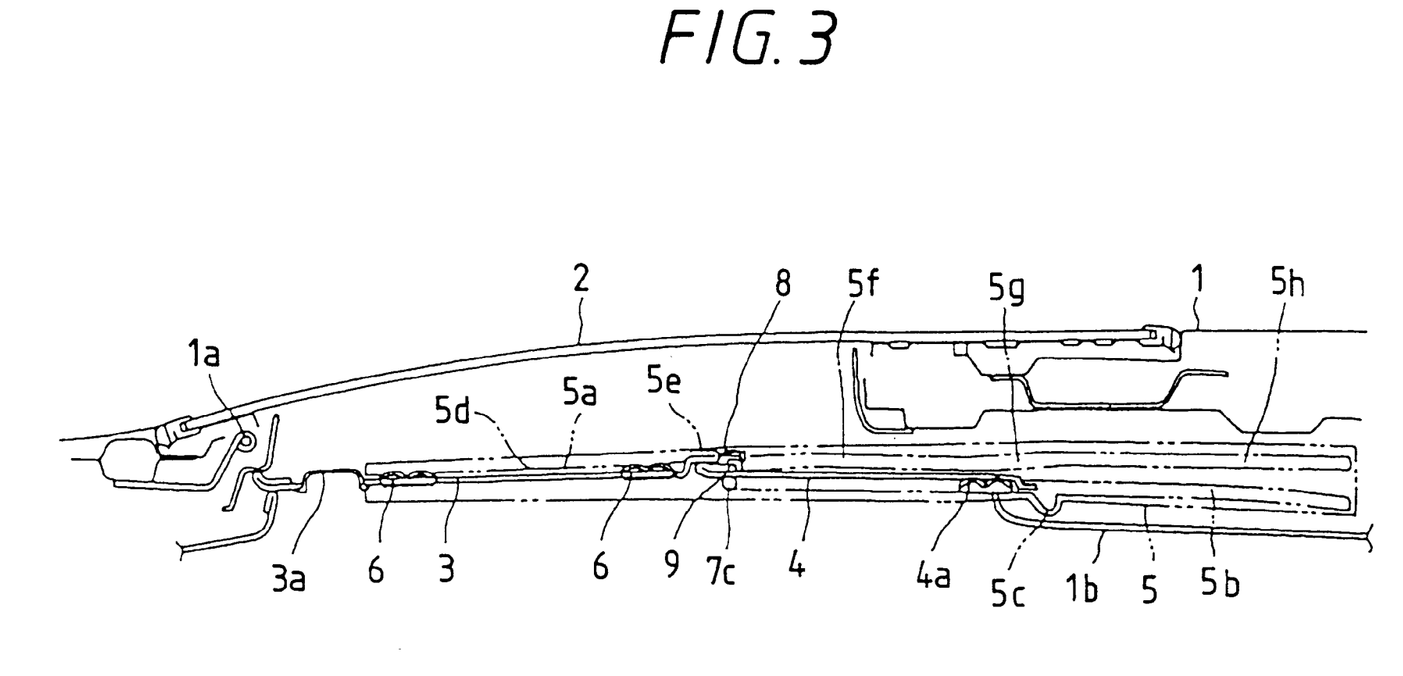
FIG. 3 is a longitudinal side view of a roof showing a state in which the sunshade is closed halfway.
Figure 4:
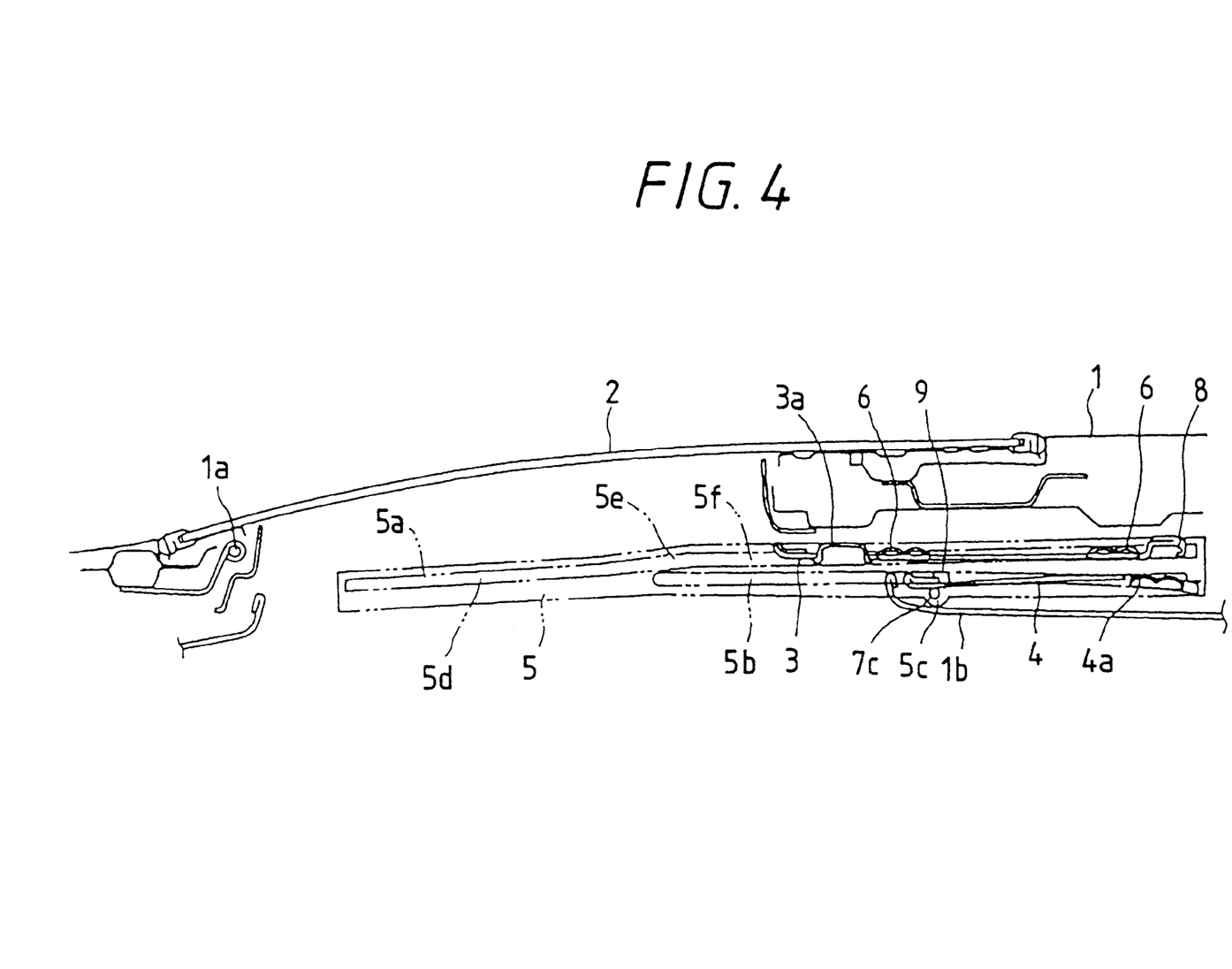
FIG. 4 is a longitudinal side view, similar to above, of a roof showing a state in which the sunshades are fully opened.

In FIGS. 3 and 4, reference numeral 1 denotes a roof of a vehicle and reference numeral 2 a light-transmissive sunroof lid of glass or the like pivotably supported on a front edge portion of an opening formed in the roof at a front end thereof by a hinge 1a and adapted to be lifted and lowered in vertical directions at a rear end thereof. A front sunshade 3 and a rear sunshade 4, which are arranged one after the other in a longitudinal direction, are mounted under the sunroof lid 2 in such a manner as to slide in longitudinal directions on longitudinally oriented guide rails 5 provided on both sides of the opening and a storing portion 1b, which will be described later.

Figure 7:
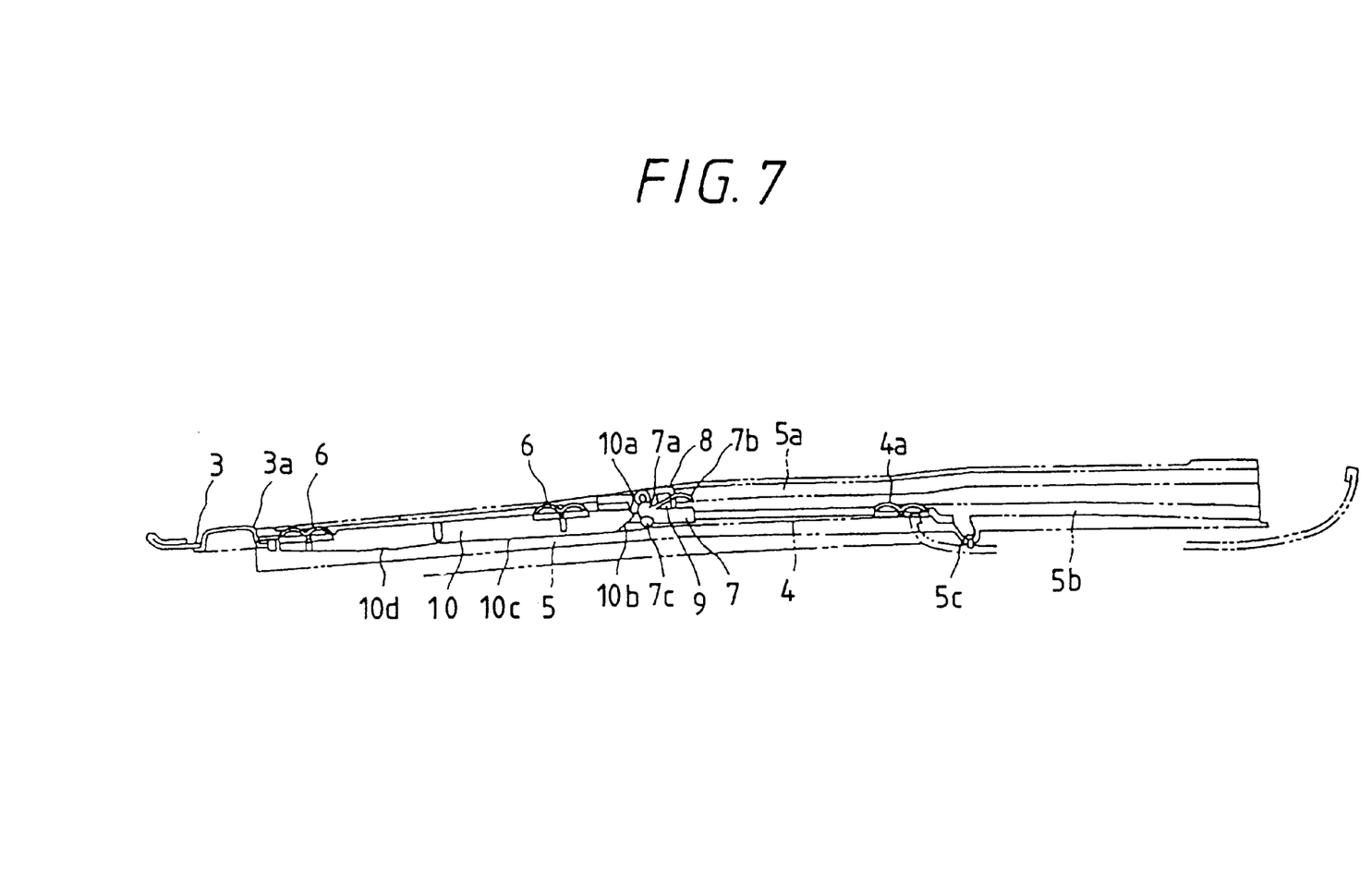
FIG. 7 is an enlarged longitudinal side view of a sunshade showing a state in which the sunshade is fully closed.
Figure 9:
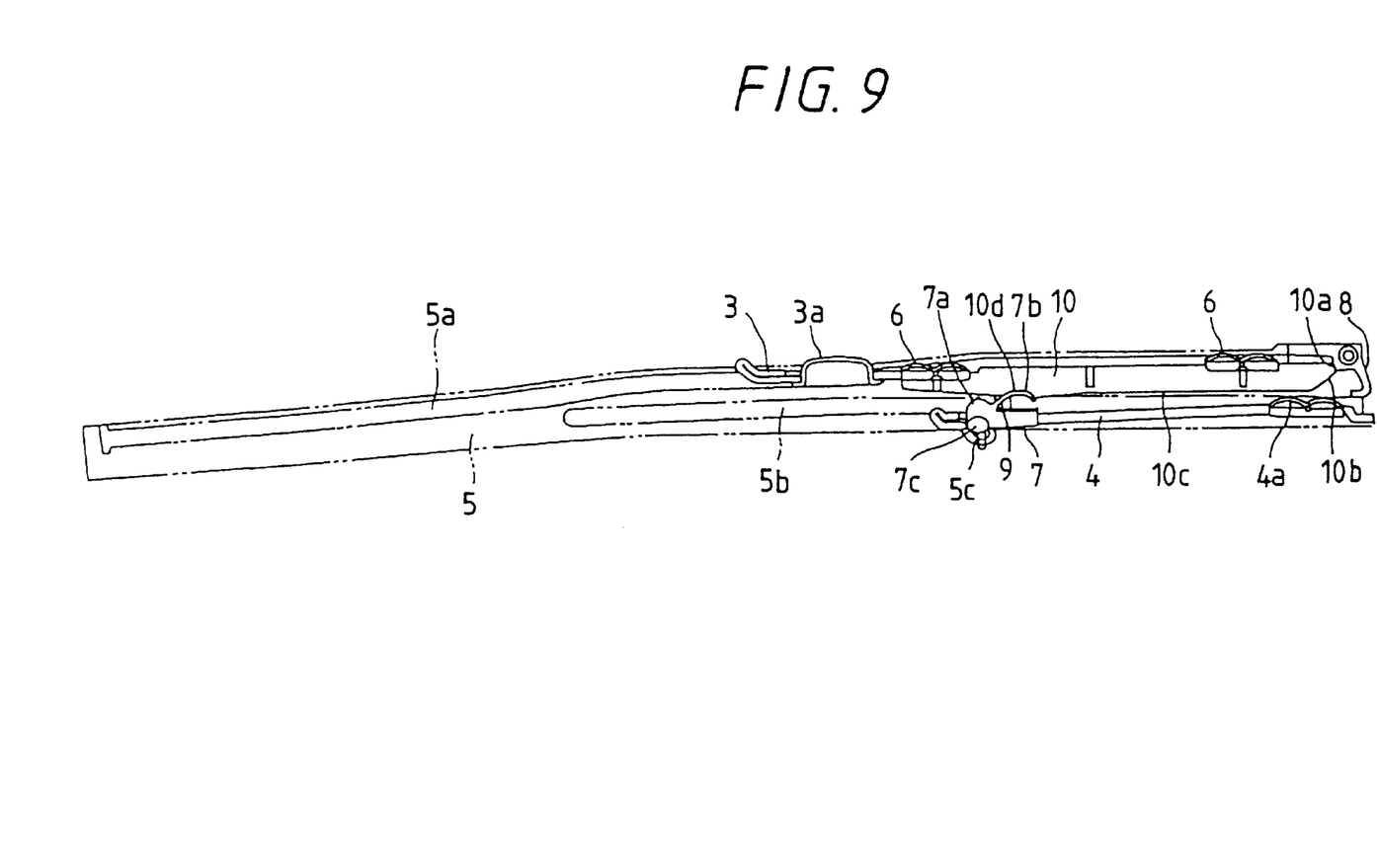
FIG. 9 is an enlarged longitudinal side view of a sunshade showing a state in which the sunshade is fully opened.

As shown in FIGS. 3 and 7, the front and rear sunshades 3, 4 can move between a fully closed position where they align with each other in a longitudinal direction under the sunroof lid 2 with a rear end of the front sunshade 3 abutting against a front end of the rear sunshade 4 to thereby close the opening and, as shown in FIGS. 4 and 9, a fully opened position where they are stored in the storing portion 1b formed under a portion of the roof 1 that is rearward of the opening in such a manner as to be vertically stacked one on the other.

Formed in each guide rail 5 are two grooves; a first guide groove 5a extending from near a front end to adjacent to a rear end thereof to slidably support the front sunshade 3 from its fully closed position to its fully opened position and a second guide groove 5b extending under the front guide groove 5a from a position near a center of the opening to near the rear end of the guide rail 5 to slidably support the rear sunshade 4 from its fully closed position to its fully opened position. A drop-in portion 5c which is recessed toward the rear is formed in a lower portion of the second guide groove 5b at a longitudinal position near a center thereof.

The first guide groove 5a comprises a substantially horizontal front straight portion 5d extending rearward from the front end of the guide rail 5, a front inclined portion 5e continuous with a rear end of the front straight portion 5d and inclined moderately upwardly toward the rear, an intermediate straight portion 5f positioned slightly higher than the front straight portion 5d and extending substantially horizontally toward the rear, a rear inclined portion 5g continuous with a rear end of the intermediate straight portion 5f and inclined moderately upwardly toward the rear and a rear straight portion 5h continuous with a rear end of the rear inclined portion 5g, positioned slightly higher than the intermediate straight portion 5f and extending substantially horizontally to therear end of the guide rail 5. The front inclined portion 5e is positioned above a front end of the second guide groove 5b, and the rear inclined portion 5g is positioned substantially directly above the drop-in portion 5c.

Figure 1:
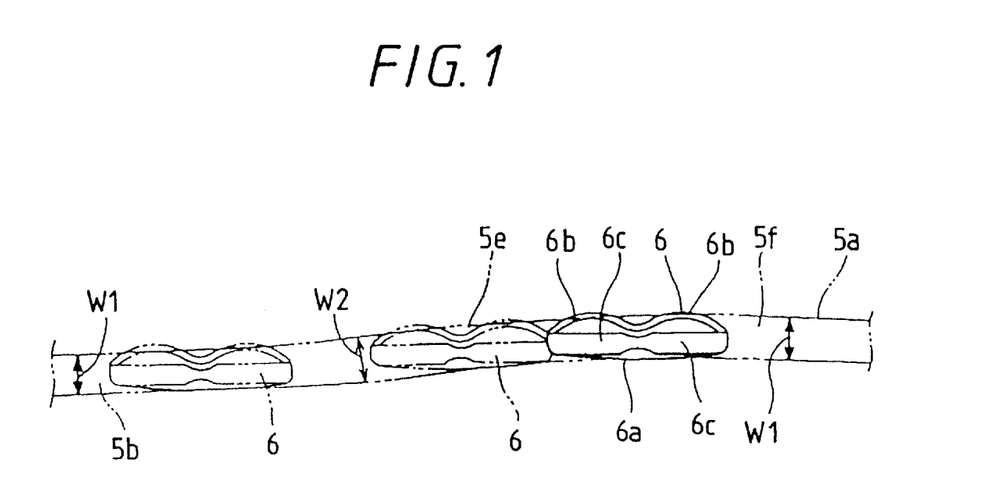
FIG. 1 is a side view of a first embodiment of the present invention showing a state in which a sliding member passes through an inclined portion of a guide groove.

A vertical gap W2 in the front and rear inclined portions 5e, 5g at the respective intermediate portions thereof is made slightly larger than a vertical gap W1 in the respective straight portions 5d, 5f, 5h at their intermediate portions (only the front inclined portion 5e is shown in FIG. 1).

Figure 5:
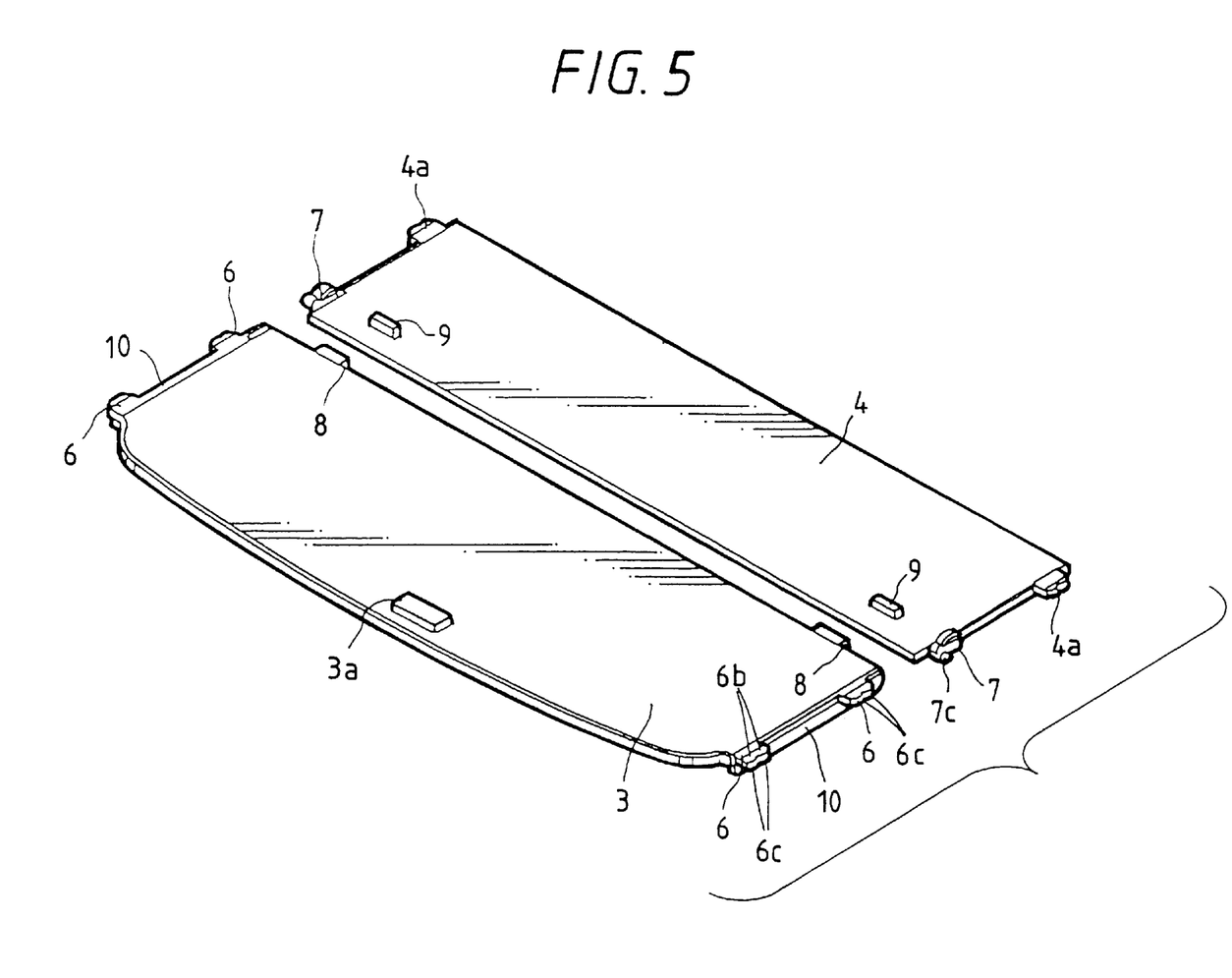
FIG. 5 is a perspective view showing the front and rear sunshades.
Figure 6:
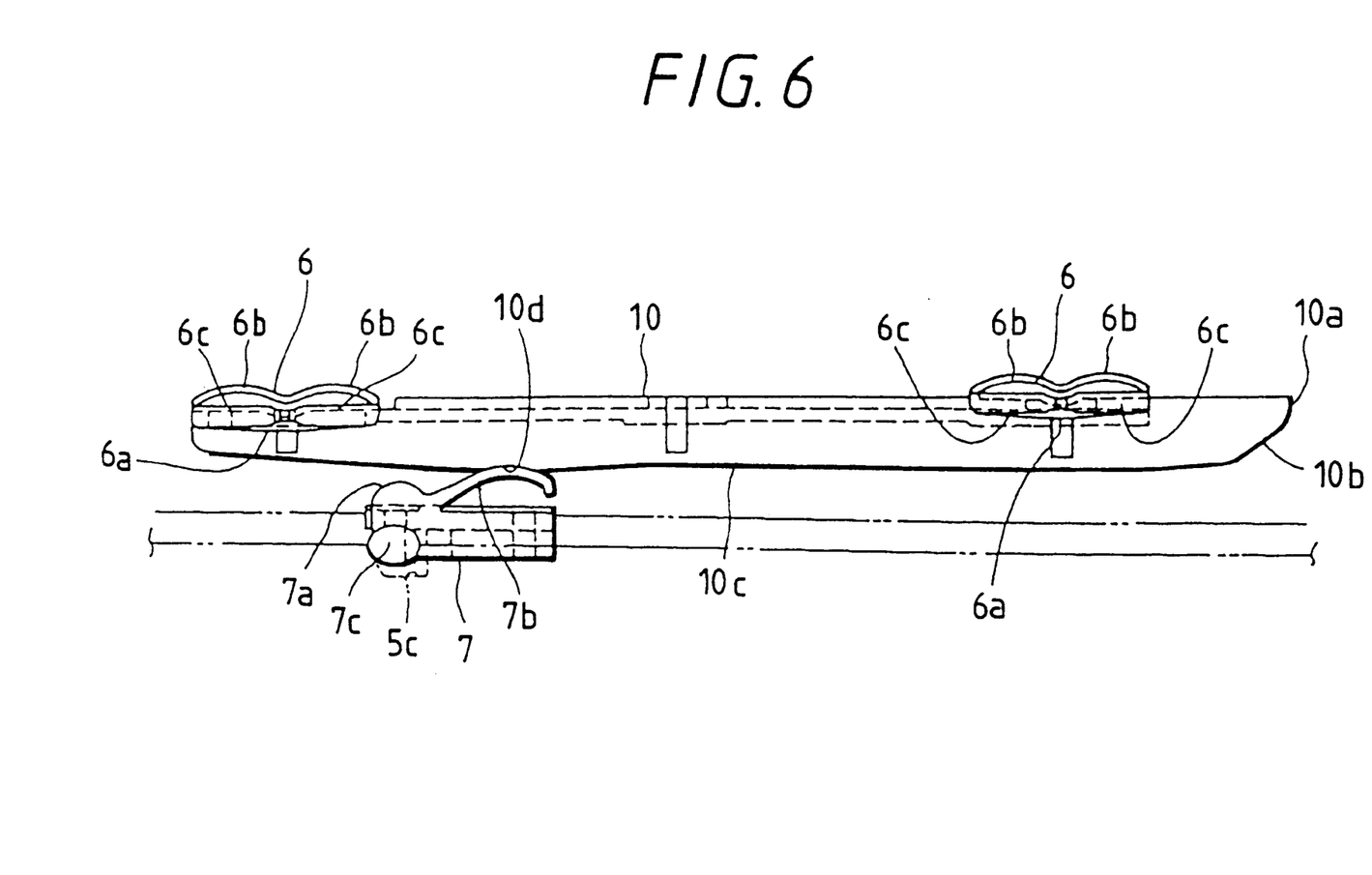
FIG. 6 is a a side view showing a relationship between a side plate of the front sunshade and a front sliding member of the rear sunshade.

An operating portion 3a, which is projected so as to face upwardly, is formed in a lower surface of the front sunshade 3 at a laterally central position at the front portion, and a pair of front and rear sliding members 6 are, as shown in FIGS. 5 and 6, formed on side plate 10 fixed to each of left and right sides of the sunshade in such a manner as to slidably fit in the first guide groove 5a of the guide rail 5.

Each of the sliding members 6 is formed from an elastically deformable synthetic resin material or the like into a substantially flat plate-like shape which is generally larger in length than in thickness. A lower surface of the sliding member 6 is convexed downwardly when viewed sideways, and an apex portion is constituted by a convexly curved surface 6a located at a center of the sliding member 6. An upper surface of the sliding member is formed into an elastically deformable wavy shape comprising two upwardly facing convexly curved continuous surfaces 6b, 6b, as viewed sideways, in which apex portions are located at positions closer to front and rear ends thereof, respectively. In addition, as with the upper surface, a side surface of the respective sliding members 6 that faces left and right is also formed into an elastically deformable wavy shape comprising two convexly curved constinuous surfaces 6c, 6c, as viewed from the top, in which apex portions are located at positions closer to front and rear ends thereof, respectively, whereby the looseness of the sunshade 3 in lateral directions is prevented when it comes into press contact with a side surface of the first guide groove 5a.

By being formed into the configuration described above, the sliding members 6 can slide in a stable fashion with respect to vertical directions of the straight portions 5d, 5f, 5h in the first grooves 5, with the convexly curved surfaces 6a, 6b, 6cbeing brought into a sliding contact with the guide grooves at those three points. When passing through the inclined portions 5e, 5g or when the front sunshade 3 is inclined, at least the convexly curved surfaces 6a, 6b are brought into contact with the guide grooves at these two points, thereby making it possible for the sunshade to slide smoothly. In addition, when the sliding members 6 reach the inclined portions 5e, 5g from the straight portions 5d, 5f, 5h, or when the sunshade 3 is inclined, the sliding members 6 move smoothly along the guide grooves on the curved surf aces acting as points of contacts, whereby the sliding members 6 can slide smoothly without being stuck and the concentration of wear to any specific local portion can be prevented by the contacts which move as described above.

The vertical gap W1 in the respective straight portions 5d, 5f, 5h in the first guide groove 5ais made to be substantially equal to a vertical gap between the apex portions of the upper and lower convexly curved surfaces 6b, 6a resulting when the sliding members 6 become horizontal or made smaller only by a margin of compression, and the vertical gap W2 in the front and rear inclined portions 5e, 5g at the respective intermediate portions thereof is made larger than the above gap W1. Thus, an increase in effective width of the sliding members 6 occurring when the sliding members 6 pass through the inclined portions 5e, 5g as a result of the difference in longitudinal orientation between the inclined portions 5e, 5g and the sliding members 6 can be absorbed by making the gap W2 in the inclined portions 5e, 5ggreater than the gap W1 in a manner as described. It is desirable to set the gap W2 in the inclined portions 5e, 5g at a value such that when they pass through the inclined portions 5e, 5g, the sliding members 6 do not become loose and the upper and lower surfaces of the sliding members 6 at all times keep contact with the front and rear inclined portions 5e, 5g on at least one of the curved surfaces thereof, which act as a point of contact, respectively, with a slight elastic deformation being present on those points of contact, and such that the sliding members 6 are slightly inclined in a vertical direction.

The side plate 10 is fixed to each side surface of the front sunshade 3 for connecting the front and rear sliding members 6 provided thereon, and formed on the side plate 10 at a rear end thereof are a perpendicular abutment portion 10a and an inclined portion 10b inclined forwardly downwardly below the abutment portion 10a, and in addition, a check portion 10d recessed upwardly is formed in a lower edge 10c at a position closer to a front portion thereof.

Sliding members 7 are formed on both sides of the rear sunshade 4 at a front portion thereof in such a manner as to protrude therefrom in lateral directions. As shown in FIGS. 5 and 6, integrally formed on each sliding members 7 are a portion 7a for abutment with the abutment portion 10a and the inclined portion 10b on the side plate 10 of the front sunshade 3, a vertically elastically deformable elastic tongue piece 7b adapted not only to slide on the lower edge 10c of the side plate 10 but also to engage with the check portion 10d and a pin 7c adapted not only to slidably be fitted in the second groove 5b but also to drop in the drop-in portion 5c. In addition, sliding members 4a are formed on both sides of the rear sunshade 4 at a rear portion thereof which sliding members are slidably fitted in the second grooves 5b.

The elastic tongue piece 7b is brought into engagement with the check portion 10d when the front sunshade 3 and the rear sunshade 4 are put in the fully opened state so as to prevent the abrupt forward movement of the front sunshade 3 when the vehicle is urgently stopped and the occurrence of a floating of the rear sunshade and a vertical looseness of the front and rear sunshades 3, 4.

A pushing means is constituted by the above side plate 10 and the sliding member 7 for pushing the front end portion of the rear sunshade 4 until the fully opened position is reached when the front sunshade 3 is moved rearward.

In FIG. 5, reference numeral 8 denotes a hook member pivotably supported on the rear portion of the front sunshade 3, and reference numeral 9 a member for engagement with and disengagement from the hook member 8. The hook member 8 is biassed downwardly by a spring (not shown), and when the front sunshade 3 is slid forwardly from the fully opened position and reaches substantially halfway from the storing portion 1b, the hook member 8 is brought into engagement with the member 9 for engagement and pulls out of the drop-in portion 5c the pin 7c of the sliding member 7 which has dropped therein, the hook member 8 functioning to cause the pin 7c to continue to slide therewith in a direction toward the fully closed position after displacing the sunshade 4 upwardly at the front end thereof.

A pulling-out means is constituted by the hook member 8 and the members 9 for engagement for pulling out the front end portion of the rear sunshade 4 until the fully closed position is reached when the front sunshade 3 is moved forward.

In the fully closed state shown in FIGS. 3 and 7, the front sunshade 3 and the rear sunshade 4 are in abutment with each other at the rear end and the front end, respectively and are disposed substantially on the same horizontal plane with no difference in level, the opening being thereby closed. In addition, the front and rear sliding members 6 on the front sunshade 3 are fitted in the front straight portions 5d of the first guide grooves 5a.

Figure 2:
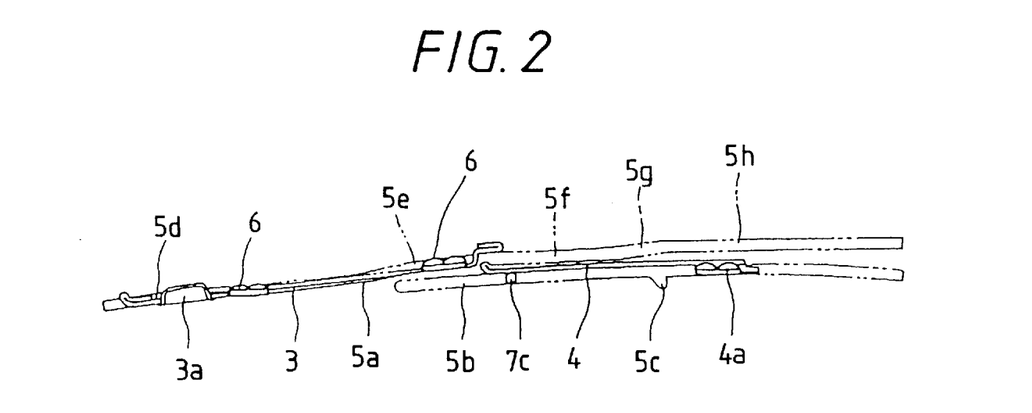
FIG. 2 is a longitudinal side view of sunshades showing a state in which the sunshade is opened halfway.

When the front sunshade 3 is slid rearward from this fully closed state by activating the operating portion 3awith the finger, as shown in FIG. 2, the rear sliding members 6 enter the front inclined portions 5e from the front straight portions 5d, the front sunshade 3 continuing to be slid rearward while being displaced upwardly at the rear portion thereof. Then, the abutment portions 10a of the side plates 10 come into abutment with the portions 7a for abutment of the sliding members 7 to thereby push the rear sunshade 4 rearward, both the front sunshade 3 and the rear sunshade 4 continuing to be slid together in a direction toward the fully opened position.

When the rear portion of the front sunshade 3 is displaced upwardly, the front sliding members 6 at the front portion thereof slide along the front straight portions 5d, while the rear sliding members 6 at the rear thereof slide along the front inclined portion 5e, and therefore, there is caused a difference in locus of the movements of the respective sliding members 6, and the front sunshade 3 is inclined slightly forwardly downwardly. However, the difference in locus of the movements and the inclination are absorbed by the front inclined portion 5e whose vertical cap is made large. In other words, as shown in FIG. 1, when the rear sliding member 6 moves from a position indicated by imaginary lines to a position indicated by solid lines, a point of contact between the lower convexly curved surface 6a and the bottom surface of the first guide groove 5a moves from a substantially central portion of the convexly curved surface 6a to the rear portion, and a point of contact between the upper surface of the sliding member 6 and the upper end surface of the first guide groove 5a moves from two points at the apex portions of the front and rear convexly curved surfaces 6b, 6b to one point slightly forward of the apex portion of the front convexly curved surface 6b, and a portion forward of the apex portion of this front convexly curved surface 6b mainly experiences the elastic deformation. The deflection amount of the respective convexly curved surfaces 6a, 6b of the rear sliding member 6 at that moment is maintained substantially constant whether it is in the front straight portion 5d or in the front inclined portion 5e, and therefore, sliding resistances generated when the rear sliding member 6 passes through the front straight portion 5d and through the front inclined portion 5e, respectively, become substantially consistent, and thus the front sunshade 3 can always be caused to slide with a constant operating force. In addition, when the front sliding member passes through the front inclined portion 5e, although there are caused a difference in locus of the movements of the front and rear sliding members and an inclination of the front sunshade, as with the previous case, those can be absorbed.

Figure 8:
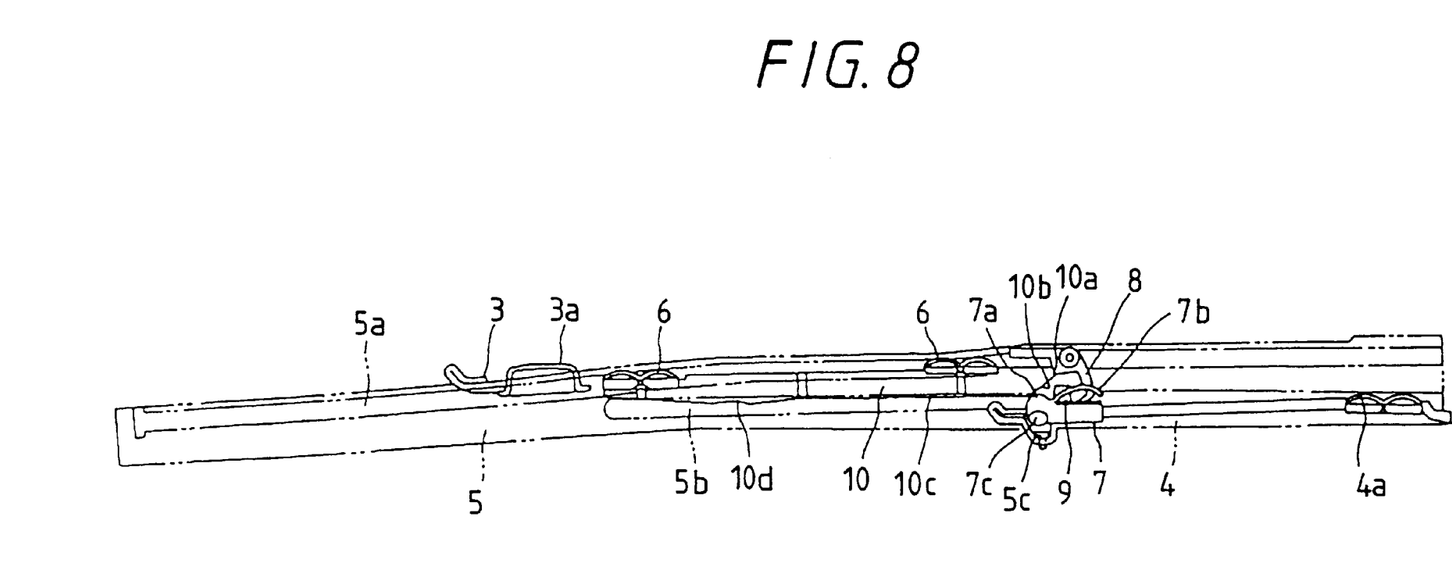
FIG. 8 is an enlarged longitudinal side view of a sunshade showing a state in which the sunshade is opened halfway.

Then, as shown in FIG. 8, when the rear sunshade 4 is entirely stored in the storing portion 1b with the pins 7c of the sliding members 7 reaching the drop-in portions 5c, the pins 7c are pushed in the drop-in portions 5c by the inclined portions 10b of the side plates 10 via the portions 7a for abutment, and the rear sunshade 4 is displaced downwardly at the front end thereof. At that time, when the rear sliding members 6 of the front sunshade 3 enter the rear inclined portions 5g, there is caused a difference in locus of the movements of the front and rear sliding members 6 or an inclination of the front sunshade 3, but, as with the previous case, they can be absorbed.

Furthermore, when the front sunshade 3 is slid in the direction toward the fully opened position, the lower edges 10c of the side plates 10 come into a sliding contact with the elastic tongue pieces 7b while deflecting the same, are then guided into the rear straight portions 5h in the first guide grooves 5a, and continue to be slid while displacing the rear sunshade 4 upwardly. Finally, as shown in FIGS. 4 and 9, the front sunshade 3 and rear sunshade 4 are stacked one on the other in a vertical direction, and are stored entirely in the storing portion 1b, the fully opened state being thereby produced.

In the fully opened state, the elastic tongue piece 7b is in an elastic engagement with the check portion 10d, and a looseness of the sunshades is prevented that would otherwise be caused by the floating of the rear sunshade 4. In addition, a checking force is applied to the sliding front sunshade 3 so as to prevent the erroneous slide of the front sunshade 3.

Next, when it is operated to move from the fully opened state in the direction toward the fully closed position by depressing the operating portion 3a with the finger, the front sunshade 3 is slid forward so as to be pulled out of the storing portion 1b, and when it is pulled out substantially halfway, the hook members 8 are brought into engagement with the members 9 for engagement to pull the pins 7c out of the drop-in portions 5c, and after the rear sunshade 4 is displaced upwardly at the front portion thereof, when both the front sunshade 3 and the rear sunshade 4 are slid forward together, the rear end of the front sunshade 3 and the front end of the rear sunshade 4 are brought substantially into abutment with each other, whereby the opening is completely closed.

In addition, even when the front and rear sliding members 6 pass through the front and rear inclined portions 5e, 5g in the direction toward the fully closed position, as described above, a difference in locus of the movements of the relevant siding members and an inclination of the front sunshade 3, which are caused similarly, can also be absorbed in the same manner.

In the above embodiment, the sunshade is described as divided into two halves, but the sunshade is not limited thereto. Regarding the structure of the guide groove and the sliding member, it is needless to say that the present invention can be applied to a single sunshade.

Figure 10:
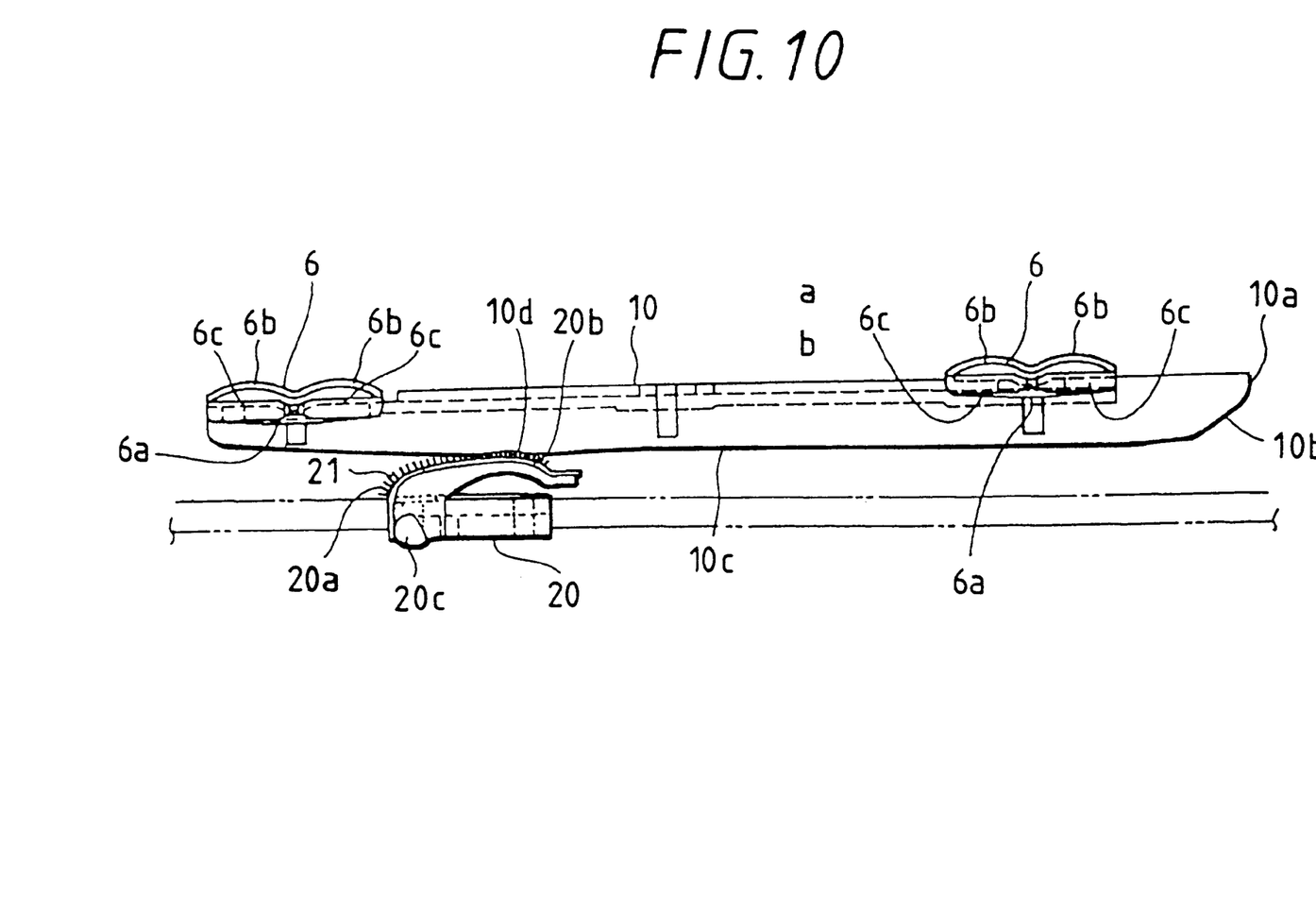
FIG. 10 is a side view of a second embodiment of the present invention showing a state in which a sliding member passes through an inclined portion of a guide groove.

FIG. 10 shows a second embodiment of the present invention.

In the second embodiment, as with the sliding member 7 in the first embodiment, a damper member 21 is provided on a side of a sliding member 20 provided on both sides of the front end portion of the rear sunshade 4 which is brought into contact with the side plate 10f the front sunshade 3, that is, on a surface of the sliding member 20 covering a portion 20a for abutment to an elastic tongue piece 20b.

Preferably, this damper member 21 is constituted by flocking piles planted in the surface of the portion of the sliding member 20 described above. For instance, they can be produced by weaving flocking piles of resin fibers into a supporting fabric of nylon fibers and welding the supporting fabric with the fillings so planted thereinto to the aforementioned surface of the sliding member 20 using ultrasonic waves.

However, other known filling planting technologies may be used for planting flocking piles in the relevant surface of the sliding member, or the damper member 21 may be formed of rubber or other suitable materials.

The portion 20a for abutment, elastic tongue piece 20b and pin 20c of the sliding member 20 perform the same functions as performed by the portion 7a for abutment, elastic tongue piece 7b and pin 7c of the sliding member 7 used in the first embodiment, but the configurations of the former members are slightly changed from those of the latter members.

The construction of the second embodiment except for what is described above on the configurations remains the same as that of the first embodiment, and like reference numerals are imparted to like constituent members, and therefore a description thereof will be omitted.

In the second embodiment, when the front sunshade 3 starts to be opened from the fully closed state, the abutment portion 10a of the side plate 10 is first brought into a soft abutment with the damper member 21 on the surface of the portion 20a for abutment on the sliding member 20, i.e., the flocking piles, and then, the inclined portion 10b rides on the damper member 21, and furthermore the lower edge 10c of the side plate 10 slides over the upper surface of the damper member 21.

At this time, the damper member 21 reduces noises caused when the members involved are brought into impact or collision with each other and sliding noise and also allows the side plate 10 to slide smoothly relative to the sliding member 20.

In addition, the damper member 20 may be applied to a surface of the side plate 10 that will be brought into contact with the sliding member, i.e., the portion 10a for abutment, inclined portion 10b and lower edge 10c of the side plate 10.

In the first and second embodiments, the side plate 10 is provided on the front sunshade 3 and the sliding members 7, 20 are provided on the rear sunshade 4, but the side plate 10 may be provided on the rear sunshade 4 with the side plate being turned upside down, while the sliding members 7, 20 may be turned upside down so as to be provided on the front sunshade 3.

According to the present invention, with the simple construction in which the vertical gap in the inclined portions of the guide groove is made larger than the vertical gap in the straight portions thereof, since the sliding resistance generated when the sliding members of the sunshade pass through the inclined portions can be made substantially identical to that generated when they pass through the straight portions, it is possible to operate the sunshade so as to slide smoothly with a constant operating force at all times.

Further, when the sliding members reach the inclined portion from the straight portion or when the sunshade is inclined, points of contact between the sliding members and the guide grooves move smoothly on the curved surfaces, and the sliding members can slide smoothly without being stuck. Moreover, the concentration of wear on any specific local portion can be prevented through the movement of the above points of contact.

Further, in the straight portions in the guide groove, the sliding members can be brought into a sliding contact with the guide grooves totally at three points; at one point either on the upper or the lower surface and at the other two different points, and therefore they can slide in a stable fashion. Moreover, when the sliding members pass through the inclined portions or when the sunshade is inclined, the sliding members are brought into contact with the guide grooves at at least upper and lower two points, the sliding members being thus able to slide in a smooth fashion.

Still further, with the simple construction in which the side plates are provided on the both sides of the front sunshade and required sliding members are provided on the both sides of the front sunshade, it is possible to securely prevent the occurrence of a floating of the rear sunshade and a vertical looseness of the front and rear sunshades when the opening is fully opened. In addition, it is also possible to prevent the rubbing and damage of the skin materials of the sunshades by preventing the direct contact between the sunshades.

In addition, since the pushing means is provided closer to the guide means of the sunshades, there is eliminated a risk of an excessive force being applied to the guide means, thereby making it possible to allow the both sunshades to be smoothly opened and/or closed. Moreover, the front end of the rear sunshade can securely be dropped in by the inclined portions.

Further, the looseness of the front and rear sunshades can securely be prevented, thereby making it possible to allow them to be moved in a smooth fashion. And it is possible to prevent an abrupt forward movement of the front sunshade for instance when the vehicle is urgently stopped when the sunshades are in the fully opened state by imparting a checking force to the front sunshade. And it is possible to reduce impact and collision noises generated when the side plates are brought into collision with the sliding members, as well as sliding noise.

Further, it is possible not only to absorb scatter in accuracy in dimensions of the side plates and sliding members but also to prevent the looseness of those members when the tips of flocking piles fall down.

In addition, since the side plates or the sliding members are allowed to slide over the tips of flocking piles that have fallen down, there is caused little friction resistance, resulting in a stable operating force for opening and/or clsing the sunshades.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A vehicle sunshade device comprising:
   a sunshade for opening and closing an opening formed in a roof of a vehicle;
   a sliding member provided on a side of said sunshade, a longitudinal length of said sliding member being larger than a vertical height thereof, said sliding member being elastically deformable in a vertical direction; and
   a guide rail disposed on a side of said opening, said guide rail having a guide groove including a straight longitudinally oriented portion which extends substantial horizontally and an inclined portion continuous with said straight portion, said sliding member being slidably fitted in said guide groove, upper and lower surfaces of the sliding member remaining in constant contact with the guide groove irrespective of the position of the sliding member in the guide groove,
   wherein a vertical gap in said inclined portion at least at an intermediate portion thereof is larger than a vertical gap in the straight longitudinally oriented portion.

2. The vehicle sunshade device according to claim 1, wherein one of the upper surface and the lower surface of said sliding member is formed into a convexly curved surface.

3. A vehicle sunshade device comprising:
   a sunshade for opening and closing an opening formed in a roof of a vehicle;
   a sliding member provided on a side of said sunshade, a longitudinal length of said sliding member being larger than a vertical length thereof, said sliding member being elastically deformable in a vertical direction; and
   a guide rail disposed on a side of said opening, said guide rail having a guide groove including a straight longitudinally oriented portion which extends substantial horizontally and an inclined portion continuous with said straight portion, said sliding member being slidably fitted in said guide groove,
   wherein a vertical gap in said inclined portion at least at an intermediate portion thereof is made larger than a vertical gap in said straight portion wherein one of an upper surface and a lower surface of said sliding member is formed into a convexly curved surface in which an apex portion is located at a center of said sliding member, and the other of said upper surface and said lower surface is formed into a wavy configuration having two convexly curved surfaces in which apex portions are located at positions closer to front and rear ends of said sliding member, respectively.

4. A vehicle sunshade device comprising:

a front sunshade and a rear sunshade arranged one after the other in a longitudinal direction for opening and closing an opening formed in a roof of a vehicle;

guiding means provided on a side of said opening for guiding said front and rear sunshades between a fully closed position where said front and rear sunshades are arranged to align with each other in a longitudinal direction to thereby close said opening and a fully opened position where said front and rear sunshades are positioned below and rearward of said opening with said front sunshade being stacked above said rear sunshade; and pushing means for pushing a front end of said rear sunshade until said rear sunshade reaches the fully opened position when said front sunshade is moved rearward, said pushing means comprising:

a sliding member disposed on one of said rear sunshade and said front sunshade; and   a side plate disposed on the other of said rear sunshade and said front sunshade, said side plate comprising:

an abutment portion provided at a rear end of said side plate, said abutment portion being to be brought into abutment with said sliding member so as to push said rear sunshade rearward;

an inclined portion provided below said abutment portion inclining forwardly and downwardly to push said sliding member downwardly and rearward when said rear sunshade reaches or approaches the fully opened position; and     a lower edge extending continuously and forward from a front end of said inclined portion, said lower edge reaching at least a position directly above said sliding member so as to prevent an upper movement of said sliding member when said front and rear sunshades are located in the fully opened position.

5. The vehicle sunshade device according to claim 4, wherein an elastic tongue piece is disposed on said sliding member to press said sliding member on said lower edge.

6. The vehicle sunshade device according to claim 5, wherein a check portion is provided on said lower edge of said side plate to impart a resisting force against a movement of said front sunshade in the longitudinal direction when said elastic tongue piece is brought into engagement therewith.

7. The vehicle sunshade device according to claim 4, wherein a damper member is disposed on one of a contacting surface between said sliding member and said side plate.

8. The vehicle sunshade device according to claim 7, wherein said damper member is flocking piles planted on one of the contacting surface between said sliding member and said side plate.

\* \* \* \* \*